United States Patent [19]
Cole et al.

[11] Patent Number: 6,106,049
[45] Date of Patent: Aug. 22, 2000

[54] TANK FOR COVERING THE TANK SOCKET OF VEHICLE FUEL TANKS

[75] Inventors: John Cole, Hannover; Otto Dörries, Langenhagen, both of Germany

[73] Assignee: Bernhard Mittelhauser, Germany

[21] Appl. No.: 08/828,280

[22] Filed: Mar. 21, 1997

[30] Foreign Application Priority Data

Mar. 21, 1996 [DE] Germany ................ 296 05 289 U

[51] Int. Cl.[7] .................................................. B60J 9/00
[52] U.S. Cl. .............................. 296/97.22; 220/86.2
[58] Field of Search ................ 296/97.22; 220/86.2

[56] References Cited

U.S. PATENT DOCUMENTS 4,811,984  3/1989  Hempel ........................... 296/97.22
5,165,749  11/1992  Sheppard ........................ 296/97.22

FOREIGN PATENT DOCUMENTS 688692  12/1995  European Pat. Off. .

Primary Examiner—Joseph D. Pape
Attorney, Agent, or Firm—Robert W. Becker & Associates

[57] ABSTRACT

A tank cover for a tank socket of a vehicle fuel tank has a plate-shaped molded plastic flap and a molded plastic pivot arm having a curved portion with a first leg and a second leg. A connection for connecting the first leg and the flap body to one another is provided wherein the connection has at least one connecting element connected to either the first leg or the flap body. The connection is selected from a positive-locking connection, a frictional connection, a material connection, a positive-locking, frictional connection, and combinations thereof. The second leg includes a hinge component with which the second leg is connected to the vehicle such that the flap body is pivotable about a first end.

6 Claims, 2 Drawing Sheets

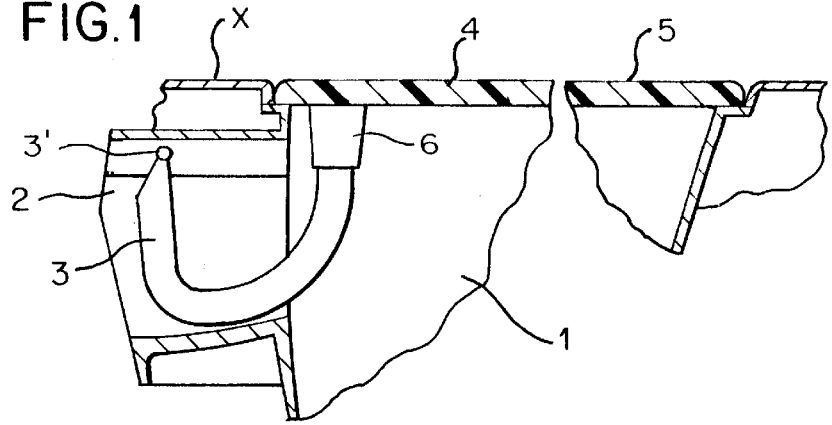
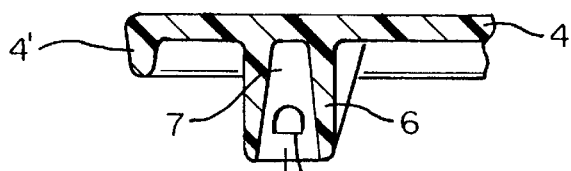
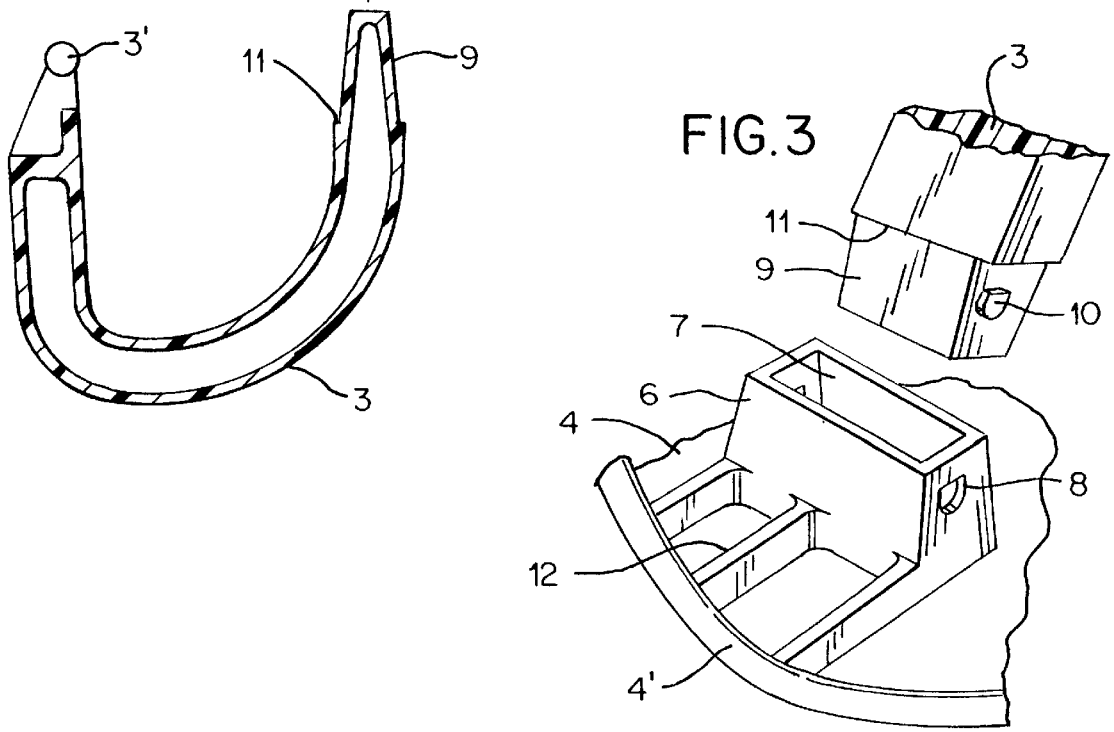

6,106,049

TANK FOR COVERING THE TANK SOCKET OF VEHICLE FUEL TANKS

BACKGROUND OF THE INVENTION

The present invention relates to a tank cover for covering the tank socket of vehicle fuel tanks, whereby the actual tank cover flap is substantially plate-shaped and provided at an inner face with a curved, especially substantially J-shaped, pivot arm.

Such tank covers according to the prior art are manufactured as a molded part of a hard but tenacious plastic material and are color-matched with the exterior skin of the vehicle. The manufacture of such a molded part requires comparatively complicated and expensive tools and, furthermore, the actual flap body is difficult to paint. In general, it is necessary to subject the flap as well as the pivot arm to a finishing step. This results is unnecessary painting steps and material loss.

SUMMARY OF THE INVENTION

It is therefore an object of the present invention to avoid the aforementioned disadvantages. The primary object of the present invention is to simplify the manufacturing tools and the painting steps and to thus provide a less expensive manufacturing process.

The inventive tank cover for a tank socket of a vehicle fuel tank has a plate-shaped molded plastic flap body and a molded plastic pivot arm having a curved portion with a first leg and a second leg. A connection connects the first leg and the flap body to one another. The connection consists of a first connecting element connected to the first leg and a second connecting element formed as a unitary part of the flap body. The connection can be a positive-locking connection, a frictional connection, and a material connection. The first and second connecting elements are combined with one other to form the connection. The second leg includes a hinge component with which said second leg is connected to the vehicle such that the flap body is pivotable about a first end.

The flap body, after molding, is subjected to a finishing step while the pivot arm remains untreated.

Preferably, the flap body and the pivot arm consist of different plastic materials.

Advantageously, the flap body has an inner face facing the tank socket and the inner face comprises a peripheral beaded edge projecting toward the tank socket.

In a preferred embodiment of the present invention, the flap body has an inner face facing the tank socket, wherein a first one of the connecting elements is a projection connected to the inner face and having a conical recess. The projection projects toward the tank socket. A second one of the connecting elements is a conical head portion connected to the first leg.

The first and second connecting elements are preferably snap-connected.

Preferably, the connection further comprises a transverse pin for securing the first and second connecting elements to one another.

Advantageously, the first and second connecting elements are secured by gluing (material connection).

According to the present invention, the pivot arm, other and the flap body, are separately produced (molded) parts one of which or both of which comprise connecting elements that are part of a connection in the form of a positive-locking and/or frictional and/or material connection for connecting the pivot arm and the flap body of the tank cover. Expediently, only the flap body is embodied as a painted component while the pivot arm, after molding, remains unfinished (untreated). A tank cover embodied as disclosed has the advantage that the molding step can be performed more easily and that furthermore for each part a different plastic material can be selected. It is furthermore of great importance that differently sized tank covers tank covers for different vehicle types, can be produced without problems. Also, it is much simpler to match the tank cover with regard to different colors and/or design requirements.

It is especially advantageous to provide between the flap body and the pivot arm a conical connection with snap connectors in the form of clips. However, it is also advantageous to provide the connection by gluing, welding, or fusing, all of which are material connections, or by insertion of securing pins. All are especially suitable because the parts of the tank cover are produced of a suitable plastic material.

BRIEF DESCRIPTION OF THE DRAWINGS

The object and advantages of the present invention will appear more clearly from the following specification in conjunction with the accompanying drawings, in which:

FIG. 1 shows a part-sectional view of a vehicle in the area of the fuel filling socket;

FIG. 2 shows in a part-sectional exploded view of the components of the tank cover of FIG. 1;

FIG. 3 shows a detail of FIG. 2 in a perspective exploded representation;

DETAILED DESCRIPTION OF THE PREFERRED EMBODIMENTS

Figure 4:
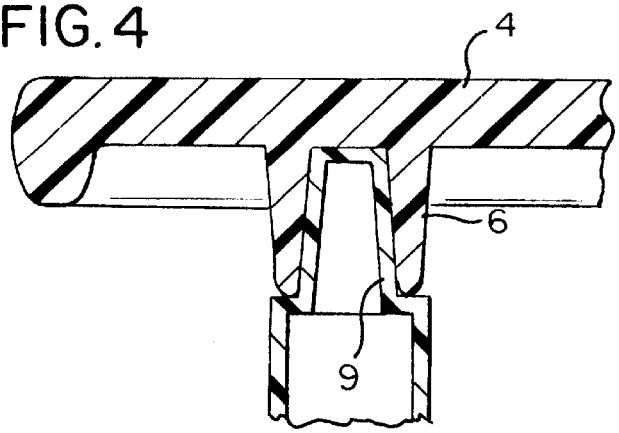
FIG. 4 shows a frictional connection between the pivot arm and the flap body.
Figure 5:
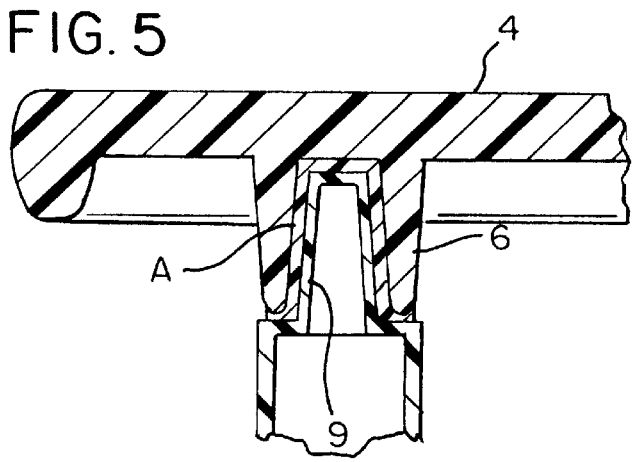
FIG. 5 shows a glued connection (adhesive layer A) between the pivot arm and the flap body.
Figure 6:
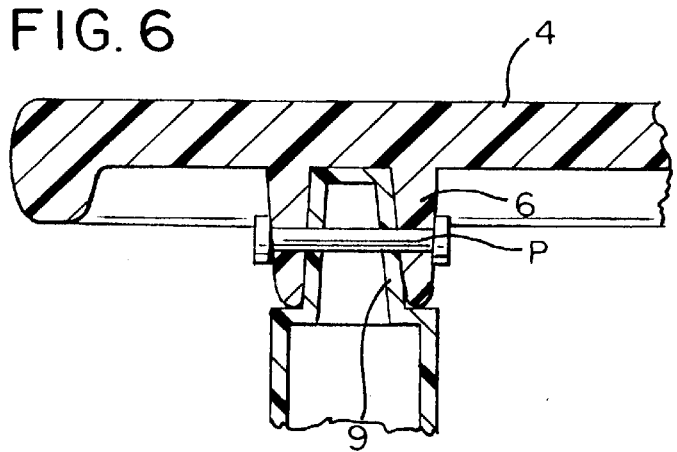
FIG. 6 shows a transverse pin P for securing the pivot arm at the flap body.

The present invention will now be described in detail with the aid of a specific embodiment utilizing FIGS. 1–3.

In a substantially funnel-shaped housing 1 the non-represented tank socket with its closure cap are positioned. The housing 1 has at one side thereof a recess 2 into which one leg of the curved pivot arm 3 connected by the other leg to a plate-shaped flap body 4 projects.

The flap body 4 closes the housing 1 when in the folded position. Its lacquered (painted) exterior surface 5 is practically flush with the exterior skin x of the vehicle. It is understood that the color of the flap body 4 and of the exterior skin x are matched. In order to be able to pivot the flap body 4, the pivot arm 3 is provided at its free end with laterally projecting pins 3'0 which engage corresponding blind holes of the recess 2 of the housing 1. Thus, the flap body 4 is pivotable outwardly such that the tank socket is accessible.

The flap body 4, and the pivot arm 3 are manufactured as molded parts of a hard but tenacious plastic material. The pivot arm 3 is not subjected to any further finishing steps. The flap body 4, on the other hand, is subjected to finishing steps such as painting.

In order to produce an operable tank cover, the flap body 4 in the vicinity of one of its edges is provided with a projection 6 with a conical recess 7 in the form of a blind hole. At opposite locations of the sidewall of the projection 6 substantially circular penetrations (holes) 8 are provided.

The free end of the pivot arm 3 is provided with a conical head portion 9 that matches the recess 7. Opposite sides of the head portion 9 are provided with small projections 10.

Upon insertion of the head portion 9 into the recess 7 the projections 10 (clips) will engage the holes 8 with minimal elastic deformation of the sidewalls of the projection 6. Thus a snap connection is realized which provides a sufficiently secure connection between the pivot arm 3 and the flap body 4.

Instead of such a snap-on connection it is also possible to provide a connection secured by a transverse pin P (see FIG. 4c), a glued connection with adhesive layer A (see FIG. 4b), or a frictional connection (see FIG. 4a). Furthermore, it is expedient to provide the head portion 9 with a step 11 that can rest at the end face of the projection 6.

With the invention it is also possible to design the pivot arm 3 and the flap body 4 as desired with regard to stability considerations. For example, the flap body 4, for increasing its stiffness, may be provided with a peripheral inwardly projecting beaded edge 4'. Furthermore, it is possible to provide ribs 12 at its inner face.

The present invention is, of course, in no way restricted to the specific disclosure of the specification and drawings, but also encompasses any modifications within the scope of the appended claims.

What we claim is:

1. A tank cover for a tank socket of a vehicle fuel tank, said tank cover comprising:

a solid plate-shaped molded plastic flap body;

a molded plastic pivot arm having a curved portion with a first leg and a second leg;

a connection for connecting said first leg and said flap body to one another, wherein said connection consists of a first connecting element connected to said first leg and a second connecting element formed as a unitary part of said flap body;

said connection being selected from the group consisting of a positive-locking connection, a frictional connection, and a material connection, wherein said first and second connecting elements are combined with one other to form said connection; and said second leg including a hinge component with which said second leg is connected to a vehicle such that said flap body is pivotable about a first end.

2. A tank cover according to claim 1, wherein said flap body, after molding, is subject to a finishing step while said pivot arm remains untreated.

3. A tank cover according to claim 1, wherein said flap body and said pivot arm consist of different plastic materials.

4. A tank cover according to claim 1, wherein said flap body has an inner face facing the tank socket and wherein said inner face comprises a peripheral beaded edge projecting toward the tank socket.

5. A tank cover according to claim 1, wherein said flap body has an inner face facing said tank socket, wherein said second connecting element is a projection connected to said inner face and having a conical recess, said projection projecting toward the tank socket, and wherein said first connecting element is a conical head portion connected to said first leg.

6. A tank cover according to claim 5, wherein said first and said second connecting elements are snap-connected.

* * * * *